(12) United States Patent  
Ohta et al.

(10) Patent No.: US 6,174,627 B1
(45) Date of Patent: Jan. 16, 2001

(54) NONAQUEOUS ELECTROLYTE SECONDARY BATTERY AND METHOD OF PREPARING THE SAME

(75) Inventors: Tomoyuki Ohta; Junji Tabuchi, both of Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/071,494

(22) Filed: May 4, 1998

(30) Foreign Application Priority Data

May 2, 1997 (JP) .................................................... 9-114789

(51) Int. Cl.[7] .............................. H01M 4/50; H01M 10/40
(52) U.S. Cl. ........................... 429/324; 429/332; 429/224; 429/231.8; 29/623.2
(58) Field of Search ................................. 429/200, 224, 429/324, 332, 231.8; 29/623.2

(56) References Cited

U.S. PATENT DOCUMENTS

| 5,260,145 | * | 11/1993 | Armand et al. | |
| 5,425,932 | * | 6/1995 | Tarascon | 429/224 X |
| 5,591,546 | * | 1/1997 | Nagaura | 429/224 |
| 5,716,737 | * | 2/1998 | Hasegawa et al. | 429/224 |
| 5,766,800 | * | 6/1998 | Manev et al. | 429/224 |

FOREIGN PATENT DOCUMENTS 5-062690 * 3/1993 (JP) .

* cited by examiner

*Primary Examiner*—Stephen Kalafut
(74) *Attorney, Agent, or Firm*—Young & Thompson

(57) ABSTRACT

A nonaqueous electrolyte secondary battery includes a pair of an anode and a cathode, the anode being made of a transition metal lithium compound oxide capable of charging and discharging lithium ions; and a nonaqueous electrolyte having a supporting electrolyte, wherein the supporting electrolyte includes lithium-bis-pentafluoroethylsulfonylimide ($Li[N(SO_2C_2F_5)_2]$) and is free of other lithium salts.

10 Claims, 2 Drawing Sheets

NONAQUEOUS ELECTROLYTE SECONDARY BATTERY AND METHOD OF PREPARING THE SAME

BACKGROUND OF THE INVENTION

The present invention relates to a nonaqueous electrolyte secondary battery, and more particularly to a nonaqueous electrolyte secondary battery having improved conservation property and discharge cycle characteristic under a high temperature condition and a method of preparing the same.

In recent years, a portable electric and electronic devices such as note type personal computers and portable telephones have improved, the required power for such portable devices has increased, whilst long operation of the devices is also required. In this circumstance, the requirements for improvement in the properties and characteristics of the chargeable battery have rapidly increased. In the prior art, a nickel-cadmium battery is used as the chargeable battery for portable devices. Recently, however, a nickel-hydrogen battery or a lithium battery have been used in place of the nickel-cadmium battery. Particularly, the lithium batter, has a higher energy density by two or three times than that of the nickel-cadmium battery. There is a lithium battery having a negative electrode using carbon material, wherein principally lithium is present in the ionized state but not in the metal state. In the ionized state, charging and discharging reactions are caused. For this reason, the lithium battery with the carbon negative electrode is so called as a lithium ion secondary battery. This lithium ion secondary battery realizes a high capacity, a high output voltage and a high energy density without raising a problem with short circuits due to dendrite growth of lithium which has been a concern in the prior art.

Lithium cobalt acid is used for a positive electrode of the lithium ion secondary battery. Lithium cobalt acid is advantageous because it easily synthesized and is highly stable due to its layered structure; for which reason the lithium ion secondary battery is superior in discharge cycle characteristics and in conservation properties. However, lithium cobalt acid is scarce and expensive. Further, the use of cobalt may raise a problem with the environment. Cobalt system materials are not suitable in view of the cost for various large size lithium ion secondary batteries for electric automobiles or road leveling. In order to settle this problem, developments for lithium nickel acid and lithium manganate have become active.

Particularly, lithium manganate having a spinel structure was discovered by Thackeray et al. as a useful material for the positive electrode of the battery and reported in Mat. Res. Bull., Vol. 18, p. 461, 1983. The lithium manganate having the spinel structure has been attractive. An estimated amount of lithium manganate deposits is large, for which reason lithium manganate is relatively cheap. Manganese is preferable in view of the environmental protection. It was also reported by Fouchard et al. in Electrochem. Sce. Proceedings Vol. 94-28, pp. 348, 1994 that lithium manganate is thermally stable. This means that use of lithium manganate may improve the safety of the battery.

The use of lithium manganate for the battery causes short cycle lifetime due to remarkable deterioration of the conservation property of the battery and also in the capacity of cycle discharge. In order to settle this problem, investigations have been made in view of synthesis conditions, composition, particle size, and specific surface area.

In Japanese laid-open patent publication No. 5-326023, it is disclosed that $Li_{1-x}Mn_2O_4$ ($1 \geq x \geq 0$) is used for investigation of dry and wet synthesis.

In Japanese laid-open patent publication No. 8-69790, it is disclosed that the specific surface area of $Li_{1-x}Mn_2O_4$ ($1 \geq x \geq 0$) is defined in the range of 0.05–5.0 $m^2/g$. As results of those investigation, almost sufficient stability thereof can be obtained at atmospheric temperature.

The use of the above described materials for the anode of the battery could not realize a sufficient conservation property and discharge cycle characteristic at a temperature higher than 50° C. At the present stage, if the lithium ion secondary battery is used for the portable telephone which are normally used under not so high temperature conditions, then there is almost no problem in use of the lithium manganate having the spinel structure. In the future, however, it is obvious that the battery is to be used under a higher temperature condition such as in note type personal computer and electric cars. For this reason, the requirement for improvements in cycle characteristic and in conservation property under high temperature conditions, for example, at not less than 50° C. have been on the increase.

In the above circumstances, it had been required to develop a novel nonaqueous electrolyte secondary battery free from the above disadvantages.

SUMMARY OF THE INVENTION

Accordingly, it is an object of the present invention to provide a novel nonaqueous electrolyte secondary battery free from the above problems.

It is a further object of the present invention to provide a novel nonaqueous electrolyte secondary battery exhibiting an improved conservation property under high temperature conditions.

It is a still further object of the present invention to provide a novel nonaqueous electrolyte secondary battery exhibiting an improved cycle characteristic under high temperature conditions.

The above and other objects, features and advantages of the present invention will be apparent from the following descriptions.

The present invention provides a nonaqueous electrolyte secondary battery having: a positive and negative electrodes, the positive electrode being made of a transition metal lithium compound oxide capable of charging and discharging lithium ions; and a nonaqueous electrolyte having a supporting electrolyte, wherein the supporting electrolyte includes at least lithium-bis-penta-fluoroethylsulfonylimide ($Li[N(SO_2C_2F_5)_2]$).

BRIEF DESCRIPTION OF THE DRAWINGS

Preferred embodiments according to the present invention will be described in detail with reference to the accompanying drawings.

DISCLOSURE OF THE INVENTION

Figure 1:
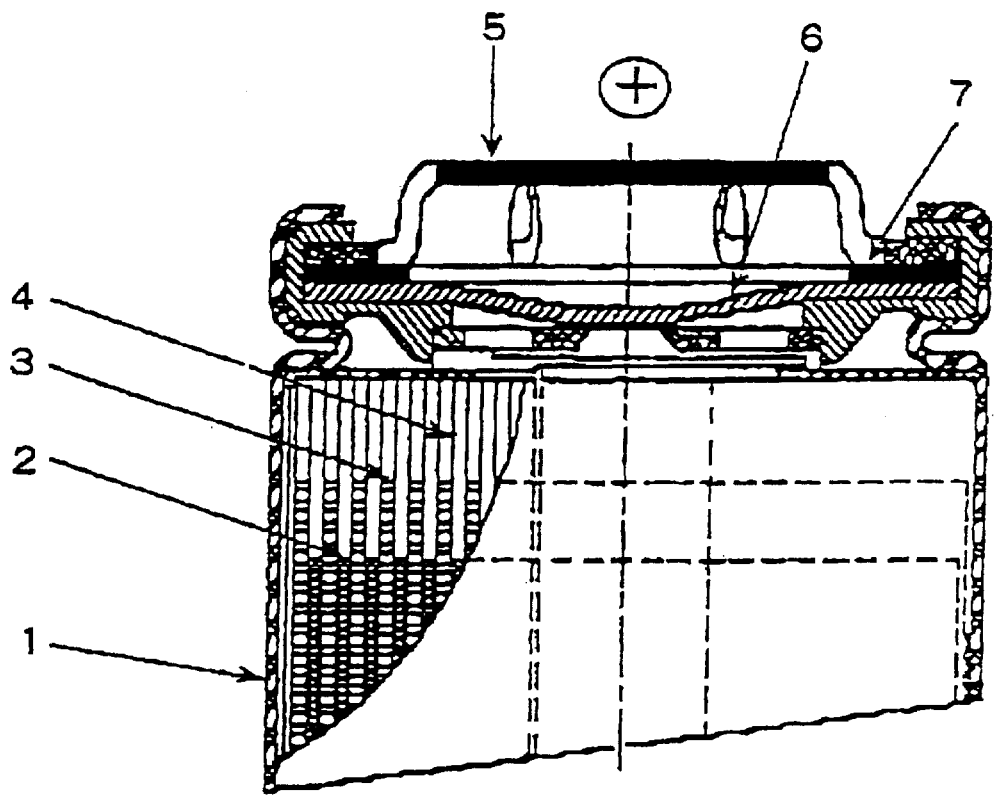
FIG. 1 is a cross sectional elevation view illustrative of a novel nonaqueous electrolyte secondary battery in accordance with the present invention.
Figure 1:
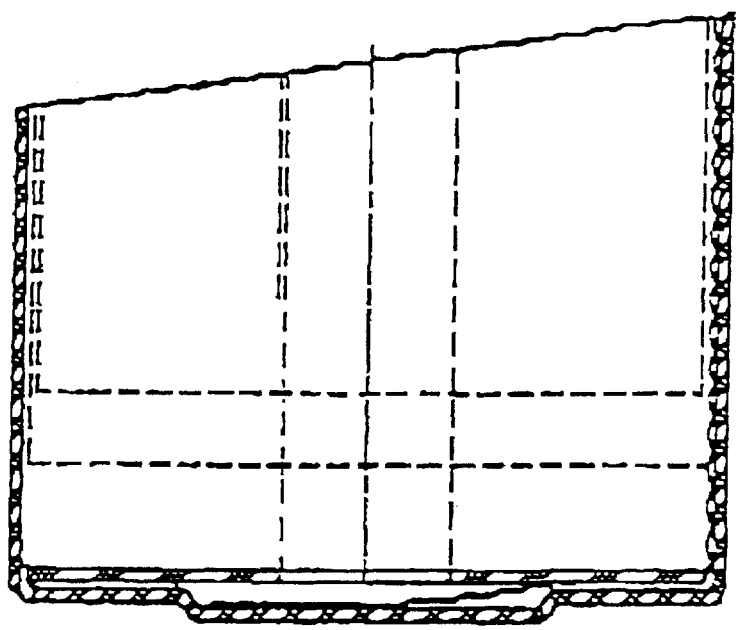

The following present invention was conceived by directing the inventor's attention onto not only properties of an electrolyte before use of the battery but also the fact that a supporting electrolyte in the electrolyte decomposes to generate a free acid during long time cycle test and conservation test.

The first aspect of the present invention provides a nonaqueous electrolyte secondary battery having: positive and negative electrodes, the positive electrode, the anode being made of a transition metal lithium compound oxide capable of charging and discharging lithium ions; and a nonaqueous electrolyte having a supporting electrolyte, wherein the supporting electrolyte includes at least lithium-bis-penta-fluoroethylsulfonylimide ($Li[N(SO_2C_2F_5)_2]$), whereby conservation properties and cycle characteristics of the nonaqueous electrolyte secondary battery are remarkably improved.

It is preferable that the transition metal is manganese and the manganese lithium compound oxide has a spinel structure. In this case, it is further preferable that the manganese lithium compound oxide having the spinel structure has a molar ratio of Li to Mn in the range of 0.51 to 0.6.

It is also preferable that the negative electrode is made of a carbon material which is capable of charging and discharging lithium ions. In this case, it is further preferable that the carbon material is graphitized carbon material.

It is also preferable that a solvent of the nonaqueous electrolyte comprises a mixture of ring-carbonate with chain-carbonate.

The second aspect of the present invention provides a nonaqueous electrolyte for a battery. The nonaqueous electrolyte includes at least lithium-bis-penta-fluoroethylsulfonylimide ($Li[N(SO_2C_2F_5)_2]$), whereby conservation properties and cycle characteristics of the battery are remarkably improved.

It is also preferable that a solvent of the nonaqueous electrolyte comprises a mixture of ring-carbonate with chain-carbonate.

The third aspect of the present invention provides a method of preparing a nonaqueous electrolyte secondary battery. The method comprising the steps of: accommodating, into a battery case, a roll body of laminations of a pair of a positive electrode sheet and a negative electrode sheet, both of which are separated by a separator sheet from each other, the positive electrode being made of a transition metal lithium compound oxide capable of charging and discharging lithium ions; putting, into the battery case, a nonaqueous electrolyte having a supporting electrolyte which includes at least lithium-bis-penta-fluoroethylsulfonylimide ($Li[N(SO_2C_2F_5)_2]$); and sealing the battery case, whereby conservation properties and cycle characteristics of the nonaqueous electrolyte secondary battery are remarkably improved.

It is preferable that the transition metal is manganese and the manganese lithium compound oxide has a spinel structure. In this case, it is further preferable that the manganese lithium compound oxide having the spinel structure has a molar ratio of Li to Mn in the range of 0.51 to 0.6.

It is also preferably that the negative electrode sheet is made of a carbon material which is capable of charging and discharging lithium ions. In this case, it is further preferable that the carbon material is graphitized carbon material.

It is also preferable that a solvent of the nonaqueous electrolyte comprises a mixture of ring-carbonate with chain-carbonate.

As described above, the nonaqueous electrolyte includes at least lithium-bis-penta-fluoroethylsulfonylimide ($Li[N(SO_2C_2F_5)_2]$), whereby conservation properties and cycle characteristics of the battery are remarkably improved.

Normally, $LiPF_6$ is used for the lithium ion secondary battery due to its high conductivity. However, $LiPF_6$ is unstable to water and is likely to show a reaction with a slight amount of water contained in the battery, whereby a free hydrofluoric acid is generated at about several tens of ppm to a few hundred ppm. This phenomenon was already pointed out in Japanese laid-open patent publication No. 5-315006, wherein the free acid is removed by a chemical absorption or a chemical reaction so that a concentration of the free acid is reduced to not more than 100 ppm to improve the cycle characteristic of the battery. Those methods of removal of the free acid by use of the chemical absorption or the chemical reaction make the processes complicated. $LiPF_6$ is also thermally unstable. It is observed that a reeducation of weight of $LiPF_6$ is initiated at about 50° C. in thermo-gravimetric analysis in nitrogen atmosphere. Even if the electrolyte from which free acids are completely removed is used, then $LiPF_6$ residing in the battery is decomposed to generate hydrofluoric acid. The above methods are not fundamental resolutions to the problems of the prior art.

When drawing the attention onto the positive electrode compound oxide material, suppression of deterioration of the capacity may be possible by controlling synthetic conditions, composition, particle diameters and specific surface area of the lithium manganate at room temperature. However, under the higher temperature condition than 50° C., an amount of the generated hydrofluoric acid is increased and also a reactivity of free acid and the anode compound oxide material is risen, whereby the anode compound oxide material is dissolved, resulting in remarkable deterioration of the conservation property and cycle lifetime of the battery.

In order to prevent the above phenomenon, it is required to remarkably reduce moisture in the electrolyte and otherwise select a supporting electrolyte that is capable of suppression of generation of free acid such as hydrofluoric acid.

The first method of remarkable reduction in moisture content is actually difficult in view of technique and cost because at the present moisture content of the electrolyte is reduced to 20 ppm or less and further reduction in moisture content is technically difficult.

The practically available method is to select the supporting electrolyte which is capable of suppression of generation of the free acid. $LiBF_4$, $LiClO_4$, $LiSO_3CF_3$, $Li[N(SO_2CF_3)_2]$, and $Li[N(SO_2C_2F_5)_2]$ are superior than $LiPF_6$ in reductino in amount of the generated free acid. $LiSO_3CF_3$ and $Li[N(SO_2CF_3)_2]$ are unavailable as reacting with aluminum used for the anode assembly in the battery. In Japanese laid-open patent publication No. 5-326018, it is disclosed that $LiSO_3CF_3$ and $Li[N(SO_2CF_3)_2]$ are used as supporting electrolyte in experimentation, but those substances are unavailable to the battery having the aluminum-containing anode assembly. In Japanese laid-open patent publication No. 5-326016, it is disclosed that $LiZ(CF_3SO_2)_n$ is used as supporting electrolyte where Z is O, N or C and if Z=0, then n=1, if Z=N, then n=2, and if Z=C, then n=3, and also it is pointed out that if this substance is used, then aluminum of the positive electrode assembly is dissolved, resulting in deterioration of the property and characteristic of the battery. In order to prevent the dissolution of aluminum, other salt is mixed thereto. In this case, however, the maintenance is complicated and this method is not suitable for mass-production.

On the other hand, $LiBF_4$ and $LiClO_4$ are lower in electrical conductivity than $LiPF_6$, for which reason those salts are engaged with problems with low temperature characteristics and rate properties.

Li[N(SO$_2$C$_2$F$_5$)$_2$] is preferred. This salt is never inferior in the electrical conductivity than LiPF$_6$, but exhibits no reaction with any materials of the battery and further is capable of suppressing generation of the free acid which are likely to dissolve the anode compound oxide material, for which reason the use of Li[N(SO$_2$C$_2$F$_5$)$_2$] improves the conservation property and cycle characteristic.

As the positive electrode active material, lithium manganate having the spinel structure is used. Electrolyte manganese dioxide and lithium carbonate are used as source materials. Those source materials are mixed at a molar ratio of lithium to manganese in the range of 0.51 to 0.6. The mixture is then burned at a temperature in the range of 600–800° C. in air or oxygen atmosphere to form a lithium manganate having a spinel structure. It was confirmed by an X-ray diffraction analysis that the formed lithium manganate has the spinel structure.

The lithium manganate having the spinel structure as the positive electrode active material is mixed with a conductive material and a binding agent for subsequent dispersion thereof into an organic solvent to be in the form of ink. This substance is applied on an aluminum foil and dried for subsequent compression molding thereof. The product is cut in the form of strips for the positive electrode.

Carbon material is used as the negative electrode active material. The carbon material is mixed with a conductive material and a binding agent for subsequent dispersion thereof into an organic solvent to be in the form of ink. This substance is applied on a copper foil and dried for subsequent compression molding thereof. The product is cut in the form of strips for the negative electrode.

The positive electrode strip and the negative electrode strip are laminated through a separator of a fine porous membrane of polyolefin and the laminations are rolled. This roll body is accommodated in a battery can before the electrolyte is put into the battery can so that the roll body is immersed within the electrolyte.

Li[N(SO$_2$C$_2$F$_5$)$_2$] is mainly used as the supporting electrolyte in the electrolyte solution at a concentration in the range of 0.1 mol/liter to 2.0 mol/liter.

As a comparative example, LiPF$_6$ is also used. For preparing a solvent, a ring-carbonate having a high dielectric constant such as ethylene carbonate or propylene carbonate is mixed with a chain-carbonate having a low viscosity such as diethyl carbonate, dimethyl carbonate or ethylmethyl carbonate at a ratio by volume in the range of 1:9 to 9:1.

The evaluations thereon are made as follows.

The charge in cycle test, a constant current charge is made at 1.0A up to 4.2V for subsequent change to another constant current charge at 4.2V which will be continued until a total charging time is 2.5 hours. A constant discharge is made at 1.0A down to 3.0V. The measurement is made at 60° C. for retention of capacity after 100 cycles to an initial capacity. Under the same condition as the cycle test, a one time discharge is made for measuring the discharge capacity to define the initial capacity. The charges are again made under the same condition as the cycle test before the battery is placed in a thermostat maintained at 60° C. for thirty days. Without re-charging, a constant discharge is made at 1.0A down to 3.0V for measurement of the capacity so as to evaluate the capacity retention to the initial capacity.

At least five samples have been prepared for every levels for averaging the same.

EXAMPLE 1

A synthesis of an anode active material was made under the following conditions. Electrolyte manganese dioxide is mixed with lithium carbonate at a 0.55 molar ratio of lithium to manganese for subsequent burning the mixture in air at 750° C. for 12 hours to synthesize lithium manganate. It was confirmed by X-ray diffraction analysis that the synthesized lithium manganate has a spinel structure and a single phase.

90.9% by weight of the synthesized lithium manganate, 5% by weight of graphite powders of averaged particle diameter of 6 micrometers as conductive material, 2% by weight of acetylene black and 3% by weight of polyvinylidenefluoride (hereinafter referred to as PVDF) were dispersed into N-methylpyrolidone (hereinafter referred to as NMP) for subsequent mixing the same so that the mixture is in the form of ink. The mixture was then applied onto opposite surfaces of an aluminum foil having a thickness of 20 micrometers and dried to remove NMP as dispersion solvent. The aluminum foil was then subjected to a compression molding by a roller pressing machine so that a total thickness of the aluminum foil with opposite surfaces covered by the mixtures was 185 micrometers. The product was cut into strips. Aluminum collector tub is attached thereto to form a positive electrode.

Graphitized mesocarbon micro-beads (hereinafter referred to as MCMB) are used as a negative electrode active material, which has been graphitized at 2800° C. and commerically available from Osaka Gas Co, Ltd. 88.0% by weight of MCMB, 2% by weight of acetylene black and 10% by weight of PVDF as binder were determined to be dispersed into NMP for subsequent mixing the same so that the mixture is in the form of ink. The mixture as then applied onto opposite surfaces of a copper foil having a thickness of 20 micrometers and dried to remove NMP as dispersion solvent. The copper foil was then subjected to a compression molding by a roller pressing machine so that a total thickness of the aluminum foil with opposite surfaces covered by the mixtures was 175 micrometers. The product was cut into strips. Nickel collector tub is attached thereto to form a negative electrode.

The above members were dried at 100° C. at not higher than 0.1 mmHg for 24 hours, before they are carried to a dry room keeping a dew point at −40° C. In this dry room, the electrolyte is injected into the battery can and then the can was sealed. The positive electrode strip and the negative electrode strip are laminated through a separator of a fine porous membrane of polyolefin having a thickness of 25 micrometers and the laminations are rolled. This roll body is accommodated in a nickel-plated steel can before the electrolyte is put into the can so that the roll body is immersed within the electrolyte, thereby to form a cylindrically shaped battery of 65 millimeters in height and 18 millimeters in diameter.

Li[N(SO$_2$C$_2$F$_5$)$_2$] commercially available from 3M is used as the supporting electrolyte in the electrolyte solution at a concentration of 1.0 mol/liter. For preparing a solvent, ethylene carbonate having a high dielectric constant is mixed with diethyl carbonate having a low viscosity at a ratio by volume of 3:7.

Figure 2:
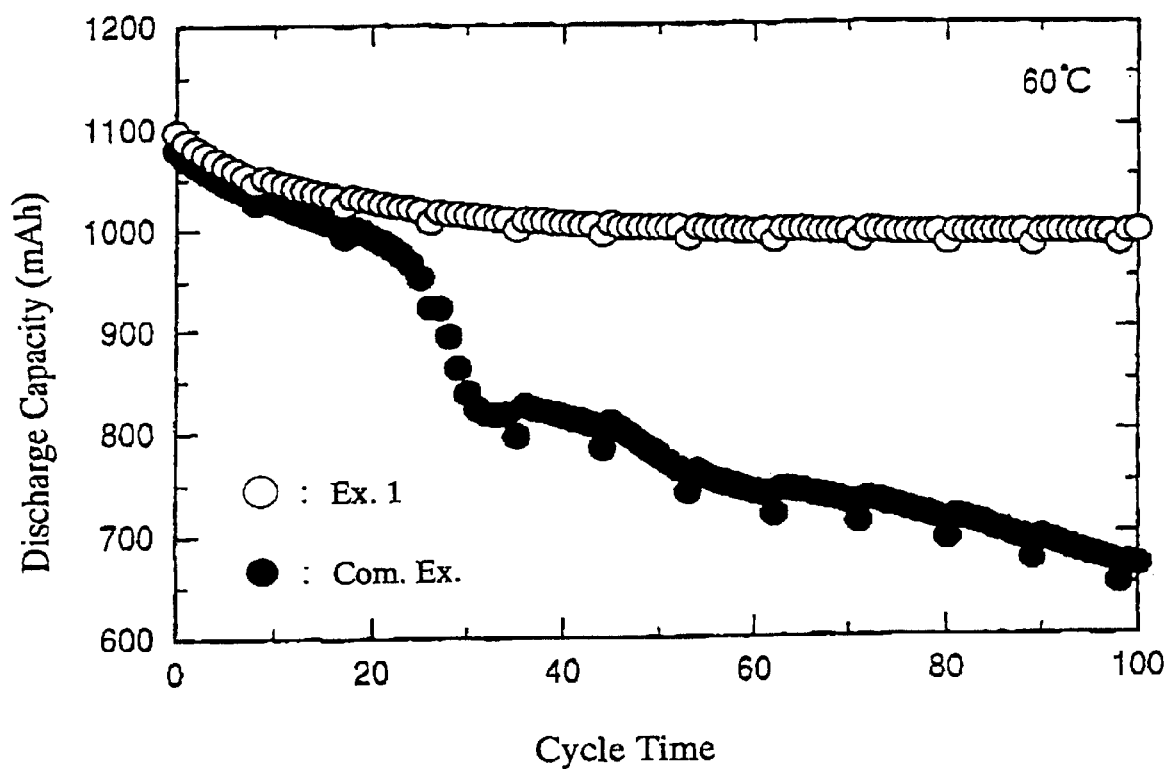
FIG. 2 is a graph illustrative of variation in discharge capacity over cycle time of nonaqueous electrolyte secondary batteries in example 1 of the present invention and in a comparative example.

The results of the cycle test at 60° C. are shown in FIG. 2. The initial discharge capacity is about 1100 mAh, whilst the discharge capacity after 100 cycle discharges is about 990 mAh which is 90% of the initial discharge capacity.

The results of the conversation test at 60° C. are shown on the following Table 1.

TABLE 1

| sample | initial capacity (mAh) | capacity after 30 days (mAh) | ratio(%) |
|---|---|---|---|
| Ex. 1 | 1100 | 1010 | 92 |
| Com. Ex. | 1080 | 770 | 71 |

From Table 1, it can be understood that the initial capacity is about 1100 mAh, whilst the capacity after 30 days is about 1010 mAh which is about 92% of the initial capacity. Since the supporting electrolyte comprises lithium-bis-pentafluoroethylsulfonylimide ($Li[N(SO_2C_2F_5)_2]$), no free acid is generated whereby the lithium manganate having the spinel structure as the positive electrode compound oxide material is free from dissolution and deterioration. The battery is also free from deterioration of the properties and characteristics.

COMPARATIVE EXAMPLE

The cycle text and the conservation text were carried out in the same manner as in Example 1 except for the use of $LiPF_6$ as supporting electrolyte.

The results of the cycle test at 60° C. are shown in FIG. 2. The initial discharge capacity is about 1080 mAh, whilst the discharge capacity after 100 cycle discharges is about 670 mAh which is 62% of the initial discharge capacity. The capacity was rapidly dropped at about 30th cycle.

The results of the conservation test at 60° C. are shown on the above Table 1. From Table 1, it can be understood that the initial capacity is about 1080 mAh, whilst the capacity after 30 days is about 770 mAh which is about 70% of the initial capacity.

Since the supporting electrolyte comprises $LiPF_6$, $LiPF_6$ is reacted with moisture in the electrolyte thereby to generate hydrofluoric acid which causes a dissolution of lithium manganese as the positive electrode active material and deterioration thereof, resulting in rapid and remarkable deterioration of the capacity. Normally, under charge/discharge cyclic conditions, deteriorations are relatively remarkable as continuously applying a current at a high voltage. A rapid drop of capacity at about 30th cycle might be caused by a deterioration of lithium manganese due to influence of hydrofluoric acid and due to the current application at the high voltage. When $LiPF_6$ is used, the initial capacity is lower by 20 mAh than that when $Li[N(SO_2C_2F_5)_2]$ is used. This fact may be caused by initiation of deterioration of lithium manganese due to influence of hydrofluoric acid before the initial discharge.

EXAMPLE 2

A synthesis of an anode active material was made under the following conditions. Electrolyte manganese dioxide is mixed with lithium carbonate at a molar ratio of lithium to manganese in the range of 0.50 to 0.65 for subsequent burning the mixture in air at 750° C. for 12 hours to synthesize lithium manganate. It was confirmed by X-ray diffraction analysis that the synthesized lithium manganate has a spinel structure and a single phase. It was confirmed that when the molar ratio of lithium to manganese is 0.50, then $Mn_2O_3$ is present. The cycle text and the conservation text were carried out in the same manner as in Example 1 except for the use of the above positive electrode active materials.

The results of the cycle and conservation tests at 60° C. are shown on the following Table 2.

TABLE 2

| Li/Mn | $Mn_2O_3$ | initial(mAh) | 100 cycle (mAh) | ratio(%) | 30 days | ratio(%) |
|---|---|---|---|---|---|---|
| 0.50 | present | 1280 | 650 | 51 | 690 | 54 |
| 0.51 | none | 1250 | 980 | 78 | 1040 | 83 |
| 0.55 | none | 1100 | 990 | 90 | 1010 | 92 |
| 0.60 | none | 900 | 810 | 90 | 830 | 92 |
| 0.65 | none | 680 | 610 | 90 | 630 | 93 |

From Table 2, it can be understood that as the molar ratio of lithium to manganese approaches 0.50, then the initial capacity is increased. If, however, the molar ratio of lithium to manganese is 0.50, then the cycle characteristic and conservation property are remarkably deteriorated. It was confirmed by X-ray diffraction analysis that when the molar ratio of lithium to manganese is 0.50, then $Mn_2O_3$ is present. This spinel structure free portion causes the drop of crystal stability. On the other hand, if the molar ratio of lithium to manganese is not less than 0.60, then the initial capacity is too low even there are no problems with the cycle characteristic and conservation property.

Consequently, the preferable molar ratio of lithium to manganese of the lithium manganate having the spinel structure suitable for the nonaqueous electrolyte secondary battery would be in the range of 0.51 through 0.60.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A nonaqueous electrolyte secondary battery having:
   a pair of positive and negative electrodes, the positive electrode being made of a manganese lithium compound oxide with a spinel structure having a molar ratio of Li to Mn in the range of 0.51 to 0.6; and
   a nonaqueous electrolyte that includes lithium-bis-pentafluoroethylsulfonylimide ($LiN(SO_2C_2F_5)_2$) and that is free of other lithium salts.

2. The nonaqueous electrolyte secondary battery as claimed in claim 1, wherein said negative electrode is made of a carbon material which is capable of charging and discharging lithium ions.

3. The nonaqueous electrolyte secondary battery as claimed in claim 2, wherein said carbon material is graphitized carbon material.

4. The nonaqueous electrolyte secondary battery as claimed in claim 1, wherein a solvent of said nonaqueous electrolyte comprises a mixture of ring-carbonate with chain-carbonate.

5. The battery of claim 1, wherein a concentration of the $LiN(SO_2C_2F_5)_2$ is 0.1 to 2.0 mole per liter of the electrolyte.

6. A method of preparing a nonaqueous electrolyte secondary battery, said method comprising the steps of:
   accommodating, into a battery case, a roll body of laminations of a pair of a positive electrode sheet and a negative electrode sheet, both of which are separated by a separator sheet from each other, the positive electrode sheet being made of a manganese lithium compound oxide with a spinel structure having a molar ratio of Li to Mn in the range of 0.51 to 0.6;
   putting, into said battery case, a nonaqueous electrolyte having a supporting electrolyte which includes lithiumbis-penta-fluoroethylsulfonylimide $(LiN(SO_2C_2F_5)_2)$ and is free of other lithium salts; and sealing said battery case.

7. The method as claimed in claim 6, wherein said negative electrode sheet is made of a carbon material which is capable of charging and discharging lithium ions.

8. The method as claimed in claim 7, wherein said the carbon material is graphitized carbon material.

9. The method as claimed in claim 6, wherein a solvent of said nonaqueous electrolyte comprises a mixture of ring-carbonate with chain-carbonate.

10. The method of claim 6, wherein a concentration of the $LiN(SO_2C_2F_5)_2$ is 0.1 to 2.0 mole per liter of the electrolyte.

* * * * *